(12) United States Patent
Eyerly

(10) Patent No.: US 6,196,502 B1
(45) Date of Patent: Mar. 6, 2001

(54) ATTITUDE CONTROL OF SPINNING SPACECRAFT WITH COUNTERSPUN CONTROLS PLATFORM

(75) Inventor: Bruce N. Eyerly, Torrance, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/344,212

(22) Filed: Jun. 24, 1999

(51) Int. Cl.[7] ....................................................... B64G 1/28
(52) U.S. Cl. ................................................................ 244/165
(58) Field of Search .................................... 244/164, 165, 244/158 R, 170

(56) References Cited

U.S. PATENT DOCUMENTS

| | | | |
|---|---|---|---|
| 4,375,878 | * 3/1983 | Harvey et al. | 244/165 |
| 4,911,385 | * 3/1990 | Agrawal et al. | 244/165 |
| 5,112,012 | * 5/1992 | Yuan et al. | 244/165 |
| 5,441,222 | * 8/1995 | Rosen | 244/165 |
| 5,820,078 | * 10/1998 | Harrell | 244/165 |

* cited by examiner

*Primary Examiner*—Galen L. Barefoot
(74) *Attorney, Agent, or Firm*—Terje Gudmestad

(57) ABSTRACT

The attitude of a spinning spacecraft whose spin axis is substantially in the plane of the orbit is controlled without the use of reaction control thrusters. A two-axis gimbal on which a momentum wheel is mounted is secured to a despun platform. The despun platform is in rotational communication with the central body. Two actuators are used to selectively pivot the gimbaled momentum wheel about each gimbal axis in order to apply a control moment to change the attitude of the spacecraft.

18 Claims, 1 Drawing Sheet

ATTITUDE CONTROL OF SPINNING SPACECRAFT WITH COUNTERSPUN CONTROLS PLATFORM

TECHNICAL FIELD

The present invention relates generally to positioning of a spacecraft, and more particularly relates to attitude control of a spinning spacecraft.

BACKGROUND ART

Attitude control of a spin stabilized spacecraft has traditionally been accomplished by pulsed thrusters which provide spin phased moments. This works well when the operational spin axis is normal to the orbit plane. The payloads in some spacecraft, however, require a nadir pointing spin axis. In order to alleviate the necessity for continuous thrusting to maintain the orbital angular rate, momentum canceling wheels are hardmounted to current spacecraft to create a zero momentum system. When it is desired to slew the spin axis from one pointing direction to another, reaction control thrusters are used to create the starting and stopping moments. If solar radiation pressure creates undesired external moments, these thrusters are also used to cancel such moments.

While reaction control thrusters are necessary, it would be desirable to use them as little as possible. There is only a limited amount of propellant available to fire the thrusters and the more that the thrusters must be fired, the less fuel is available for later maneuvers. Further, there are inherent uncertainties involving firing a thruster on time and sophisticated methods are required in order to compensate for these uncertainties.

U.S. Pat. No. 5,441,222 to Rosen discloses an attitude control system that is intended to minimize the use of thrusters. The attitude control system utilizes an agile gimbaled momentum wheel to provide attitude control moments and cancel the momentum of a spinning satellite and thus provide a zero overall system momentum. The disclosed momentum wheel assembly executes a series of coning motions to provide the correct control moments. The coning motion necessary for body attitude control and momentum control tends to require significantly more angular motion than that needed for wobble control. This is especially true when balancing techniques are employed (either passive or active) which can reduce the spacecraft wobble to an arbitrarily small value. With this configuration, the momentum wheel gimbal actuators typically need to provide large excursion, high rate, long life, and low disturbance torque position control. This results in a complex and costly implementation, such as disclosed in U.S. Pat. No. 5,820,078 to Harrell.

SUMMARY OF THE INVENTION

Accordingly, it is an object of the present invention to provide an attitude control system for a spinning spacecraft that requires smaller excursion motions.

It is a further object of the present invention to provide an attitude control system for a spinning spacecraft that will improve the durability of the assembly.

It is another object of the present invention to provide an attitude control system for a spinning spacecraft that has prolonged life and improved accuracy over prior assemblies.

In accordance with these and other objects of the present invention, an attitude control system for a spinning spacecraft is provided. The spinning spacecraft has a despun platform in rotational communication with the body of the spinning spacecraft. A momentum control system is mounted on the despun platform. The momentum control system includes a gimbal having first and second portions that are respectively pivotable about first and second orthogonal axes. The gimbal is in communication with a spinning momentum wheel. A first actuator is connected between the first portion of the gimbal and the despun platform for applying a first control moment to the despun platform about the first axis. A second actuator is connected between the second portion of the gimbal and the despun platform for applying a second control moment to the spacecraft about the second axis. The first and second actuators are respectively secured to the first and second portions of the gimbal at locations along the first and second axis respectively to avoid the undesirable application to the spacecraft of unwanted secondary moments. The first and second control moments are operative to control the attitude of the spacecraft.

These and other features and advantages of the present invention will become apparent from the following description of the invention when viewed in accordance with the accompanying drawings and appended claims.

BEST MODES FOR CARRYING OUT THE INVENTION

Figure 1:
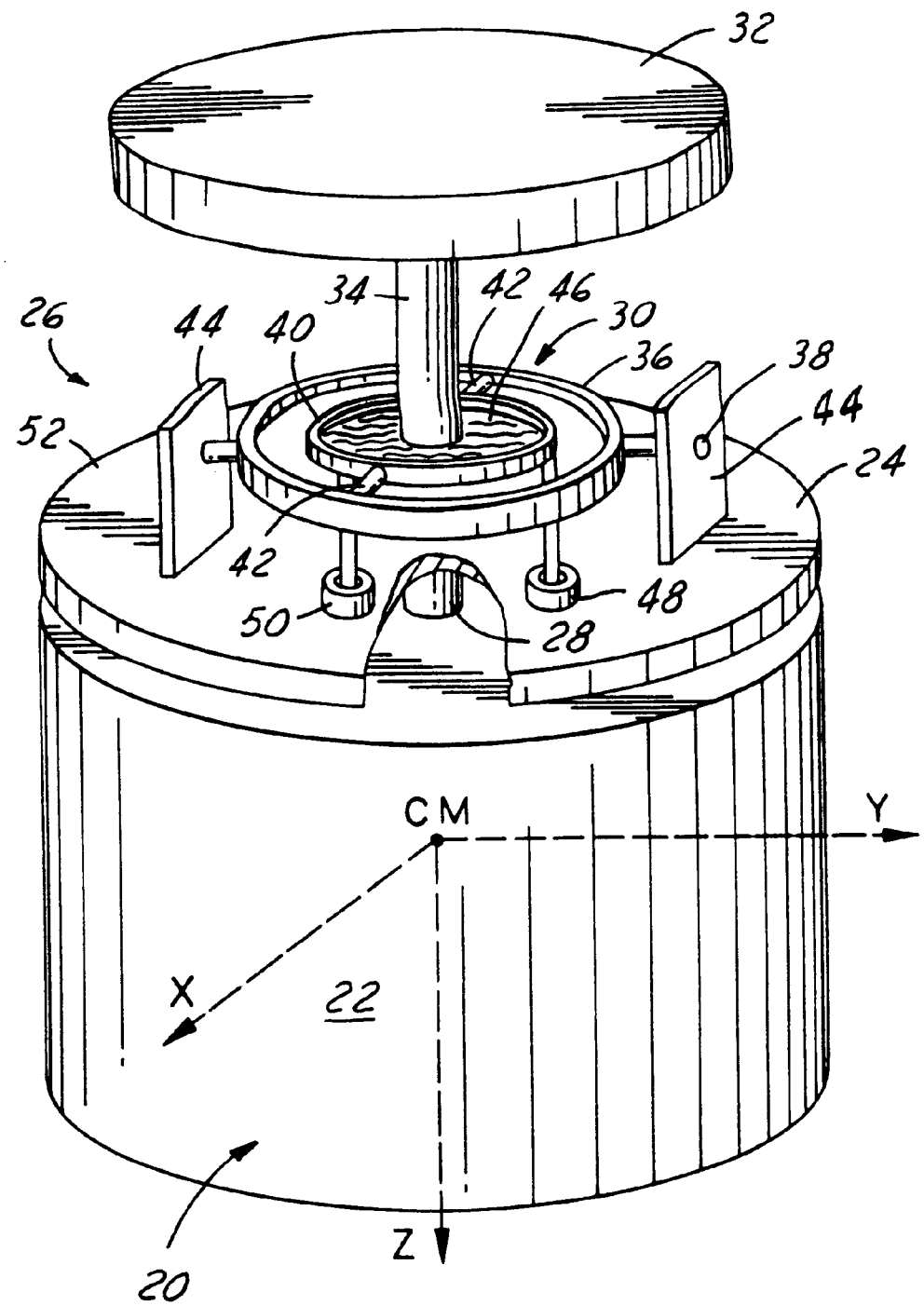
FIG. 1 is a perspective view of a spacecraft incorporating a preferred embodiment of the present invention.

The use of thrusters for attitude control of a spacecraft 20 having a central body 22 and a despun platform 24 can be precluded by use of an attitude control system 26 illustrated in FIG. 1. The spacecraft 20 is intended to have a spin axis (z-axis) substantially within the plane of the orbit, whose attitude may be controlled without the use of reaction control thrusters.

The spacecraft 20 has a center of momentum CM, which acts as the origin for the principal body axes x, y, and z, each of which is at a right angle to the other two. The despun platform 24 is in rotational communication with the spacecraft central body 22 via a shaft 28. The despun platform 24 is counterspun relative to the spacecraft body 22 via bearings, a motor, and control electronics (not shown). However, this apparatus and technique for accomplishing this counterspinning is well known in the art.

The attitude control system 26, which is mounted on the despun platform 24, comprises a two-axis gimbal 30 on which a momentum wheel 32 is mounted via a shaft 34. The shaft 34 extends generally upwardly from the despun platform 24. The gimbal 30 includes an outer annular ring portion 36 secured about a pivot 38 extending along the y-axis and an inner annular ring portion 40 secured about a pivot 42 extending along the x-axis. The gimbal 30 is mounted to despun platform 24 via supports 44, which secure the pivot 38 to the outer annular ring portion 36. The shaft 34 extends outwardly from a central portion 46 of the inner annular ring portion 40.

Control moments which affect the attitude of spacecraft 20 are selectively applied by actuators 48 and 50, respectively. The actuator 48 is secured to an outer surface 52 of the despun platform 24 and is positioned to apply a selected control moment about the x-axis via its contact with the inner annular ring portion 40. The actuator 50 is secured to outer surface 52 of the despun platform 24 and is positioned to apply a moment about the y-axis via its contact with the outer annular ring portion 36. It is preferred that actuator 48 be located along the yaxis and that the actuator 50 be located along the xaxis to balance the application of the applied control moments and to avoid the undesirable application of unwanted secondary moments.

The actuators 48 and 50 may be composed of any number of devices including electromagnetic force generators such as the voice coils of loudspeakers. In operation, a selected force developed by actuator 48 is exerted on the despun platform 24, causing it to react against the momentum wheel 32, creating a moment $L_x$ about the x-axis of spacecraft 20. Similarly, a force developed by the actuator 50 is exerted on the despun platform 24 creating a moment $L_y$ about the y-axis of the spacecraft 20.

The moments of inertia about the principal axes x, y, and z of the spacecraft 20 are $I_x$, $I_x$, and $I_z$ respectively. The spacecraft 20 spins about its z-axis with an angular rate of $W_z$ radians per second. If the spacecraft is to orbit a planet at a fixed angular orbital rate of n radians per second with no wobble, the transverse angular velocity $W_t$ of the spacecraft must be a constant n radians per second in inertial coordinates.

The motion needed to provide body pointing and momentum control is a counter-rotation relative to the central body 22 of the spacecraft 20. The motion needed for wobble compensation (resulting from asymmetric inertias in the two axes orthogonal to the spin axis) is a forward spinning motion. Relative to inertial space, the first motion is an angular offset and the second motion results in coning at twice the body spin rate.

By mounting the control system 26 on the despun platform 24, in accordance with the present invention, the large excursion motions require dramatically lower gimbal rate and life capabilities. Thus, basic attitude control can be accomplished, with simple actuators such as a conventional HS601 momentum wheel platform. See U.S. Pat. No. 5,112,012. This simplifies and reduces the cost of the satellite 20. Wobble control can be accommodated either through prior art balancing techniques or through small angle agile control of the momentum wheel position. The preferred technique of the present invention also helps isolate the rotating payload from momentum wheel generated disturbance torques, due to the physical separation between the wheel and the payload.

As shown by the equation below, and is well known in the art, the desired control moments consist of two terms.

$$L_x + jL_y = nW_z[I_z e^{-j(W_z t + \pi/2)} + (I_x - I_y)e^{j(W_z t + \pi/2)}]$$

Both of these terms are proportional to the spin speed $W_z$ and the body slew rate n. The first of these terms counter-rotates relative to the spacecraft central body 22 and is proportional to the spacecraft z-axis inertia. The second term forward rotates relative to the spacecraft central body 22 and is proportional to the inertia asymmetry between the x and y axes. In the preferred embodiment, the mounting surface 52 of the control system 26 is attached to the counter-rotating platform 24 and the shaft 28. In this configuration, the first term of the equation above is reduced to a static offset and the second term forward rotates, relative to the despun platform 24 at twice body rate, namely $2W_z$. As is described in the Rosen patent, the body rate and angular momentum in the x any y axes can be controlled by adjusting n and the phase angle of the two control moments $L_x$ and $L_y$.

The Rosen patent and its disclosure is hereby specifically incorporated by reference. By utilizing the teaching of Rosen, but applying a despun platform 24 upon which the control system 26 is mounted, the complexity of the system is significantly reduced and the need to use the thrusters to control the attitude of spacecraft 20 is further minimized.

Having now fully described the invention, it will become apparent to one of ordinary skill in the art that many changes and modifications can be made thereto without departing from the spirit or scope of the invention as set forth herein.

What is claimed is:

1. An attitude control system for a spinning spacecraft comprising:
   a despun platform in rotational communication with said spacecraft;
   a momentum control system mounted on said despun platform, said momentum control system, including a gimbal adapted to be mounted on said despun platform, said gimbal having first and second portions respectively pivotable about first and second orthogonal axis;
   a spinning momentum wheel mounted on said gimbal;
   a first actuator connected between said first portion of said gimbal and said despun platform for applying a first control moment to said despun platform about said first axis; and
   a second actuator connected between said second portion of said gimbal and said despun platform for applying a second control moment to said spacecraft about said second axis, said first and second actuators being respectively secured to said first and second portions of said gimbal at locations along said first and second axes respectively to avoid the undesirable application to said spacecraft of unwanted secondary moments being operative to control the attitude of said spacecraft.

2. The attitude control system of claim 1, wherein a shaft connects said despun platform to said spacecraft.

3. The attitude control system of claim 2, wherein said first and second portions of said gimbal are independently pivotable respectively about said first and second axes, each of said first and second portions of said gimbal being pivotable about spaced apart pivots, said first and second actuators being connected to said first and second portions intermediate the spaced apart portions thereof.

4. The attitude control system of claim 3, wherein said momentum wheel is mounted on said first portion of said gimbal.

5. The attitude control system of claim 4, wherein said second portion of said gimbal surrounds said first portion.

6. The attitude control system of claim 5, wherein said first and second portions of said gimbal respectively includes a pair of concentric mounting rings, pivotally connected with each other.

7. The attitude control system of claim 1, wherein first actuator and second actuators include electromagnetic force generators.

8. The attitude control system of claim 1, further comprising:
   a support for mounting.

9. The attitude control system of claim 1, including a shaft extending between said momentum wheel and a central portion of said first portion of said gimbal.

10. A spinning spacecraft whose spin axis is substantially in the plane of the orbit, comprising:
    a central body;
    a despun platform in rotational communication with said central body;
    a two-axis gimbal mounted to said central body, said gimbal having first and second portions respectively pivotable about first and second orthogonal axes;

a spinning momentum wheel mounted on said gimbal;

a first actuator connected between said first portion and said central body for applying a first control moment about said first axis; and a second actuator connected between said second portion of said gimbal and said despun platform for applying a second control moment to said spacecraft about said second axis, said first and second actuators being respectively secured to said first and second portions of said gimbal at locations along said first and second axes respectively to avoid the undesirable application to said spacecraft of unwanted secondary moments being operative to control the attitude of said spacecraft.

11. The spacecraft as recited in claim 10, further comprising:

a support mounting said gimbal on said central body at a pivot point.

12. The spacecraft as recited in claim 10, further comprising:

means for sensing said attitude of said spacecraft.

13. The spacecraft as recited in claim 12 wherein said means for sensing said attitude of said spacecraft is a gyroscope.

14. The spacecraft as recited in claim 12, further comprising:

a control processor for receiving said attitude from said gyroscope and for computing a control moment signal to be applied to said first and second actuators.

15. A method for controlling the attitude state of a spinning spacecraft with a spinning momentum wheel, mounted on a despun platform, comprising pivoting said wheel independently about first and second orthogonal axes by applying a first control moment to said spacecraft about said first axis and a second control moment to said spacecraft about said second axis to change said attitude state of said spacecraft, said first and second control moments being applied to said spacecraft at locations along said first and second axes respectively at locations selected to avoid the undesirable application to said spacecraft of unwanted secondary moments.

16. The method as recited in claim 15, wherein:

said first control moment is applied to a first portion pivoting about said first axes; and said second control moment is applied to a second portion of said gimbal, said second portion pivoting about said second of said axes.

17. The method as recited in claim 16, including the steps of:

sensing an attitude state of said spacecraft; and computing a control moment signal.

18. The method as recited in claim 17, including the steps of:

applying said control moment signal to said first and second actuators;

generating a force in said actuators to react a central body of said spacecraft against said gimbal with said momentum wheel;

applying selectively said first control moment using said first actuator; and applying selectively said second control moment using said second actuators.

* * * * *